June 16, 1931.  R. E. CALLER  1,809,819
WASTE FUEL MAKING METHOD AND APPARATUS
Filed March 25, 1927
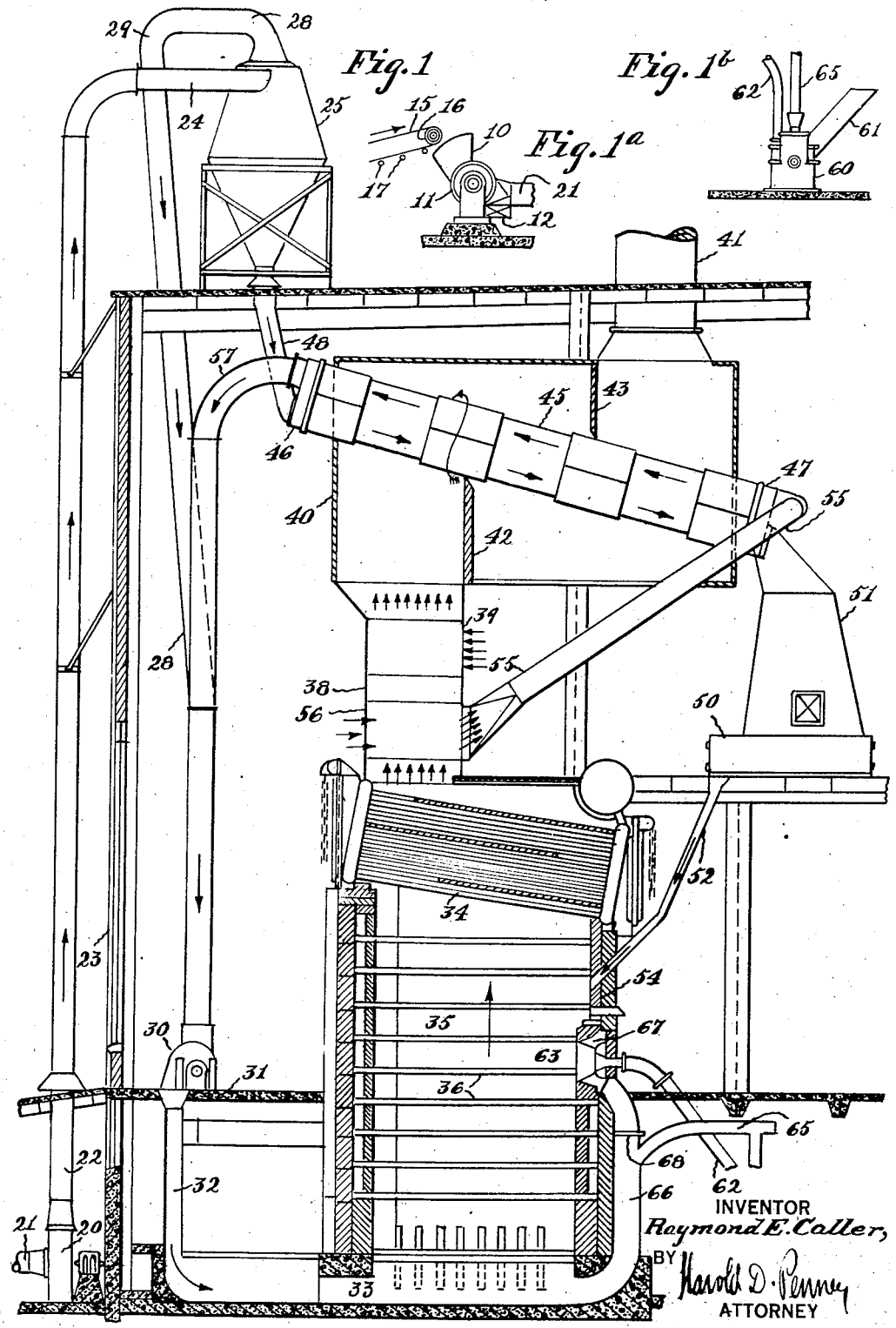
INVENTOR
Raymond E. Caller,
BY Harold D. Penney
ATTORNEY Patented June 16, 1931

1,809,819

UNITED STATES PATENT OFFICE

RAYMOND E. CALLER, OF SCARSDALE, NEW YORK

WASTE FUEL-MAKING METHOD AND APPARATUS

Application filed March 25, 1927. Serial No. 178,398.

This invention relates to methods and apparatus for converting waste material to useful material, and more particularly to means for deodorizing garbage and the like, converting it to fuel and usefully burning it, though it is noted that the invention is not limited to garbage treating or deodorizing nor in some respects even to fuel burning devices.

One object of the invention is to provide an efficient apparatus and method of this kind which will receive and disintegrate the garbage and the like, convert it into fuel for doing useful work and at the same time prevent the escape of disagreeable odors from the material.

Another object of the invention is to provide an apparatus of this kind with convenient means for keeping it in operation if the garbage or the like should give out.

Another object of the invention is to provide a suitable method and apparatus for the removal of undesirable articles before passing them to the system.

Other objects of the invention are to improve generally the simplicity and efficiency of such methods and apparatus, and to provide an apparatus of this kind which is very economical, durable and reliable in operation, and economical to construct.

Still other objects of the invention will appear as the description proceeds; and while herein details of the invention are described and claimed, the invention is not limited to these, since many and various changes may be made without departing from the scope of the invention as claimed in the broader claims.

The inventive features for the accomplishment of these and other objects are shown herein in connection with an improved rubbish and garbage converting apparatus which, briefly stated, includes a disintegrator for the garbage, rubbish and like material from which means including a fan and conveyor pipes draw fumes and material and discharge them into a collector receiving the discharge end of the conveyor pipe. Means including an exhaust pipe and a fan draw air and fumes from said collector and discharge them in a boiler furnace for aiding in supporting the combustion in the furnace and deodorizing the fumes.

A flue from the furnace conducts combustion gases through a drier chamber and heats a drier passing through said chamber and a suitable pipe conveys material from the collector to the drier from which the material passes to a stoker for delivering material from the drier into the furnace to be burned therein and produce steam in the boiler for heating, power or the like.

An economizer conduit passing through said flue conducts exterior air into the drier, which air takes up hot fumes and further not only aids in drying the material in the drier but aerates and completely deodorizes the material; and means including a fan and a pipe conduct the hot fumes from the drier into the furnace to further support the combustion. Throughout the whole system there is no chance for the fumes to escape before they pass into the furnace and are deodorized and converted to oxides as they support the combustion.

An emergency feeder is provided for discharging pulverized coal into the furnace and air to the draft pit thereof, should the supply of garbage give out or run low.

By this method I separate the fuming materials from the fumes, conduct the fumes to support combustion and feed the material as fuel to the seat of combustion for making steam or doing other useful work.

In the accompanying drawings, showing by way of example, one of many possible embodiments of the invention, Fig. 1 is a diagrammatic fragmental vertical sectional view, partly in elevation, showing the assembled apparatus;

Fig. 1a is a fragmental side elevation of the disintegrator, complementary to Fig. 1; and Fig. 1b is a fragmental side elevation showing the emergency feeder, also complementary to Fig. 1.

In practice, the rubbish, garbage, sheet metal containers and like materials are delivered to the inlet hopper 10 (Fig. 1a) of a disintegrator or "hog" 11 having a magnetic separator 12 for separating out and discharging the disintegrated metal material. This disintegrator is of well known construction and need not be further described. A slightly inclined conveyor belt 15 carried on a magnetic pulley 16 and having its lower part supported by rollers 17 serves for conveying the materials to the hopper 10 and exposes the materials to view to permit operators to pick glass and other undesirable articles therefrom, the magnetic pulley retaining and removing solid magnetic articles which the disintegrator would not be able to handle.

A centrifugal fan 20 (lower left hand corner of Fig. 1) is provided with an inlet pipe 21 (Figs. 1 and 1a) which serves for drawing air, cold garbage fumes and non-magnetic material from the disintegrator and has an upright conveyor pipe 22, for the materials, here shown secured to a building 23 and the like, and extending a distance above the level of the disintegrator and provided with a horizontal discharge end 24 extending to an axially vertical centrifugal collector 25 supported on the building and tangentially receiving said discharge end at its upper part whereby the materials are separated from the air and fumes and fall to the bottom of the collector.

An air exhaust pipe 28 from the center of the upper part of the separator, curving and extending downward as at 29, extends to one side of a double centrifugal fan 30 on the floor 31 near and somewhat above the level of the disintegrator. Said fan comprises a hot fume fan chamber and a cold fume fan chamber, the latter being connected to and drawing air and cold fumes from said air exhaust pipe 28, the outlet of the same chamber being connected to a downwardly extended cold draft pipe 32 extending into the draft pit 33 of a water tubular boiler 34 suitable for supplying steam for commercial purposes and provided with a furnace 35 having a grate 36 for burning disintegrated material. Said draft pit 33 receives draft air and fumes under pressure from said draft pipe to support the combustion and to burn and deodorize the fumes.

A flue 38 extending upwardly from the boiler to carry off combustion gases, and having a cold air inlet 39 at its upper part, discharges into an elongated exhaust gas chamber 40 joining the flue at the lower part of one end and provided with a smoke stack 41 at the upper part of the other end, the interior of the chamber having vertical transverse baffles 42, 43 forming a sinuous passage for the hot gases through the chamber.

An inclined elongated, continuously rotated cylindrical drier 45 is disposed in the chamber 40, and is heated by the combustion gases. The drier is provided with stationary upper and lower heads 46, 47 each provided with an upper air opening and a lower material opening. The air entering at the cold air inlet 39 prevents over-heating of the drier and chamber. A conveyor pipe 48 downwardly extended from the bottom of the collector 25 to the lower opening of the upper drier-head 46 discharges the material to the rotary drier to be agitated therein and to be dried by heat from the chamber 40, and also by heated air, as will be later explained. An automatic stoker 50 below the lower end of the drier and provided with a closed storage bin 51 receives material from said lower opening of the lower head 47; and a feed pipe 52 delivers the material as fuel to the furnace 35 through the upper part of a wall 54 thereof.

An economizer conduit 55 passing through the lower part of the flue 38 and receiving exterior air at its inlet end 56, preheats the air and extends to the upper opening of the lower head 47, whereby the heated air is passed over the agitated material to further dry the latter and remove the hot drying fumes therefrom through a hot garbage fume pipe 57 extending from the upper opening of the upper head 46 to the intake of the hot fume chamber of the double fan 30, the discharge port of the hot chamber being provided with a hot draft pipe also discharging into said draft pit 33. Thus both the cold and hot fumes support the combustion in the furnace and are thereby deodorized. It will thus be noted that the preheated air serves not only to dry the garbage, but to aerate and completely deodorize it by removing the residual malodorous fumes therefrom.

In order to keep the boiler running when the supply of garbage or the like fails, I provide a coal pulverizer and emergency feeder 60 (Fig. 1b) comprising a coal receiving hopper 61, a discharge conduit 62 (Fig. 1b and lower right hand corner of Fig. 1) for discharging pulverized coal into the furnace through a nozzle 63 at the mid part of one wall. The feeder also has a compressed air pipe 65 discharging into a conduit 66 in turn discharging at its lower end into the draft pit 33 and at its upper end 67 around the nozzle into the furnace. A valve 68 in the upper part of the conduit serves for closing the latter when the coal feeder is not in use to prevent the air from pit 33 from passing into the furnace at said upper end 67.

The operation may be summarized as follows:

The rubbish, garbage and the like is exposed on the belt 15 to permit picking articles therefrom and magnetically removing some of magnetic articles by the pulley 16. First, the materials are disintegrated, and the magnetic material is separated out; and, then, the garbage fumes and the non-magnetic disintegrated material are carried to the collector 25 and the materials separated from the fumes, the fumes being pneumatically conducted by the fan 30 and pipes 28, 32 into the furnace of the boiler to support combustion and deodorize these fumes.

The separated materials from the collector are conveyed and agitated in the drier 45 adjacent to, but out of contact with, the furnace gases, thereby to heat and partially dry the materials. Exterior air in the conduit 55, heated by, but out of contact with, the combustion gases is passed over the agitated material to dry the latter; and the hot fumes from the agitated material are drawn off through the pipe 57 and discharged into said draft pit. Then the dried materials are fed to the furnace and burned for heating the water in the boiler 34.

It is particularly noted that the apparatus is entirely closed except at the disintegrator 11, the inlets 56 and 39 and the stack 41, thus confining and preventing the escape of any fumes until they have been deodorized by burning in the furnace.

I claim as my invention:

1. In combination, a disintegrator; a collector; a furnace having a draft pit; means for drawing fumes and material from the disintegrator and delivering them to the collector; means including a fan having cold fume and hot fume chambers drawing air and fumes from the collector and delivering them to the furnace through said cold fume chamber of the fan; a flue extending upwardly from the furnace; a drier chamber receiving hot gases from the flue and provided with a stack; an inclined continuously rotary cylindrical drier passing through said chamber; a conveyor pipe from the collector to the upper end of the drier; a stoker receiving material from the lower end of the drier and delivering fuel to the furnace; an economizer conduit passing through the flue receiving and preheating exterior air, and extending to the lower end of the drier; a hot garbage fume pipe from the upper end of the drier to the intake of the hot fume chamber of the fan, said chamber discharging into said draft pit; and an emergency feeder for discharging pulverized coal into the furnace and air to the draft pit.

2. In combination, a disintegrator; a fan associated with said disintegrator drawing fumes and material from the disintegrator and having a discharge conveyor pipe associated therewith; a collector receiving the discharge end of the conveyor pipe; an air and fume exhaust pipe from the collector; a double fan associated with said exhaust pipe having a hot chamber and a cold chamber, the latter drawing air and fumes from said exhaust pipe; a boiler provided with a furnace having a draft pit receiving air from said cold chamber; a flue extending upwardly from the furnace and having a fresh air inlet; a drier chamber receiving hot gases from the flue; an inclined rotary drier passing through said chamber; a conveyor pipe from the collector to the upper end of the drier; a stoker receiving material from the lower end of the drier and delivering fuel to the furnace; an economizer conduit passing through the flue below said inlet and receiving exterior air, and extending to the lower end of the drier; a hot fume pipe from the upper end of the drier to the intake of the hot chamber of said fan, said hot chamber discharging into said draft pit.

3. The herein described method of treating garbage which consists in, sorting extraneous matters from the garbage, comminuting the garbage from which the said matters have been removed, exhausting malodorous fumes emanating from the said comminuted garbage, and simultaneously therewith progressively conveying said comminuted garbage through a drying zone supplied with heat derived from the subsequent combustion of said dried comminuted garbage, conveying said dry garbage to a zone of combustion, preheating air with the heat derived from the combustion of said garbage and passing said preheated air into contact with the comminuted garbage while the garbage is being dried, in a direction counter to that of the direction of conveyance of said garbage through said drying zone, whereby the drying and deodorization of said garbage is accelerated, combining said air after contact with said drying garbage, with said exhausted malodorous fumes and blowing said combined fumes and air into said combustion zone of said dried comminuted garbage, whereby said fumes and air are completely deodorized, utilizing the hot gases derived from said combustion to preheat said garbage contacting air and supply heat to said garbage drying zone, and finally expelling the non-odorous gases of combustion into the atmosphere.

4. The method of treating garbage from which extraneous materials have been removed which consists in continuously and automatically passing said garbage from the receiving hopper through the apparatus to the furnace and ash pit and in first comminuting said garbage in its said passage through the apparatus, then partially deodorizing said garbage in its passage by exhausting malodorous fumes therefrom into the furnace, then revolving and simultaneously drying, aerating and completely deodorizing the part product of said comminuted garbage in its said passage by inducing a stream of hot air to pass thereover and exhausting said air into the furnace without escape of any of the malodorous fumes therefrom into the atmosphere, subjecting the second part product of said dried garbage to combustion in the presence of said exhausted malodorous fumes whereby said fumes are deodorized, and finally utilizing the heat derived from said combustion to dry said comminuted garbage prior to combustion.

5. A method of garbage disposal which consists in continuously and automatically passing said garbage from the receiving hopper through the apparatus to the furnace and ash pit, first subjecting said garbage in its said passage through the apparatus to magnetic separation whereby all magnetic material is removed therefrom, then comminuting said remaining garbage in its said passage, then subjecting said comminuted garbage to an exhausting step whereby malodorous fumes are withdrawn from said garbage in its said passage, into the furnace then revolving and subjecting the part product of said comminuted garbage in its said passage to simultaneous drying and aerating by inducing a stream of hot air to pass thereover and exhausting said air into the furnace without escape of any of the malodorous fumes therefrom into the atmosphere, whereby said garbage is completely dried and deodorized, then subjecting the second part product of said dried garbage in its said passage to combustion in the presence of said exhausted malodorous fumes whereby said fumes are deodorized, and finally utilizing the heat derived from said combustion to dry said comminuted garbage prior to combustion.

6. The method of disposing of garbage and utilizing the combustion products thereof for steam generation which consists in continuously and automatically passing said garbage from the receiving hopper through the apparatus to the furnace and ash pit and includes the steps of first subjecting said garbage in its said passage through the said apparatus to magnetic separation to remove all magnetic material, then comminuting said remaining garbage in its said passage, then revolving and simultaneously drying, aerating and deodorizing the said comminuted garbage by inducing a stream of hot air to pass thereover and exhausting said air into the furnace without escape of any of the malodorous fumes thereof into the atmosphere, and finally burning the part product of said dried garbage in its said passage in the presence of said malodorous fumes whereby said fumes are deodorized.

7. A garbage disposal system comprising a garbage disintegrator, a discharge conveyor conduit associated with said disintegrator, a fan associated with said disintegrator and conduit adapted to blow disintegrated garbage through said conduit, a collector associated with said conduit adapted to receive said disintegrated garbage, a fume exhaust conduit associated with said collector adapted to receive malodorous fumes from the garbage in said collector, a suction fan associated with said fume conduit adapted to draw off the malodorous fumes from the garbage in said collector through said fume conduit, a drier means connected with said collector adapted to receive and dry said garbage from said collector, an incinerator connected with said fume conduit and said drier and means adapted to burn said disintegrated garbage in the presence of said exhausted malodorous fumes whereby said fumes are completely deodorized and said garbage consumed, and an additional conduit between the garbage inlet of the drier and the fume exhaust conduit for delivering fumes from the drying garbage to the incinerator.

8. A garbage salvage apparatus adapted to utilize the heat of combustion of garbage to generate steam in a boiler associated therewith, comprising a garbage disintegrator, pneumatic conveying means associated with said disintegrator adapted to withdraw garbage from said disintegrator, a collector associated with said pneumatic means adapted to receive said withdrawn garbage, a pneumatic exhaust means associated with said collector adapted to withdraw malodorous fumes and air from the disintegrated garbage in the collector, an incinerator associated with pneumatic exhaust means adapted to receive said malodorous fumes and air in the combustion zone thereof, conduit means associated with said collector adapted to convey the garbage in said collector to said combustion zone in said incinerator, a rotary drier in said conduit means and another exhaust means adapted to dry and aerate the garbage as it is conveyed to the incinerator, and conduit means connected between the garbage inlet of the drier and said other exhaust means to withdraw the residual malodorous fumes in said garbage fed to said incinerator.

9. An incinerator system including a rotary downwardly sloping drier, means associated therewith adapted to feed garbage into said drier, an economizer connected thereto above the garbage outlet end of said drier and supplying a stream of heated air thereto in a direction opposite to the movement of the garbage through said drier, a garbage furnace associated with said drier, a stoker associated with said drier and furnace for feeding garbage issuing from said drier to said furnace a suction fan and a conduit connected to the drier at a point above the garbage inlet end thereof, for exhausting said heated air with fumes from the drying garbage in said drier and passing them into the said furnace.

10. A garbage disposal system comprising a disintegrator, a collector, a furnace having a flue, a conduit including fan means, associated with said disintegrator and said collector, for delivery of comminuted garbage and fumes from the disintegrator to the collector, a second conduit and fan means associated with said collector and said furnace, for drawing air and fumes from the collector and delivering them to the furnace, a drier receiving disintegrated garbage material from the collector and delivering it into the furnace, a conduit disposed in the path of the flue gases and conducting air into the drier, and additional conduit and fan means connected between the garbage inlet of said drier and said furnace for conducting fumes from the drier into the furnace.

11. A garbage disposal system comprising a disintegrator, a fan and discharge conveyor pipe associated with said disintegrator for drawing fumes and material from the disintegrator; a collector receiving the discharge end of the conveyor pipe, a boiler having a furnace, means including an exhaust pipe and a fan associated with said collector for drawing air and fumes from said collector and delivering them to the furnace, an exhaust gas chamber, a flue from the furnace to the exhaust gas chamber, a drier disposed in said chamber, a pipe conveying material from the collector to the drier, means delivering material from the drier into the furnace, an economizer conduit passing through the flue and conducting exterior air into the drier, and an additional conduit between the garbage inlet of the drier and the furnace for conducting hot fumes from the drier into the furnace.

Signed at New York in the county of New York and State of New York this 24th day of March A. D. 1927.

RAYMOND E. CALLER.